April 19, 1960     S. LISIAK     2,933,098
AUTOMATIC VALVE FOR INFLATION OF AUTOMOBILE TIRES
Filed Sept. 6, 1957
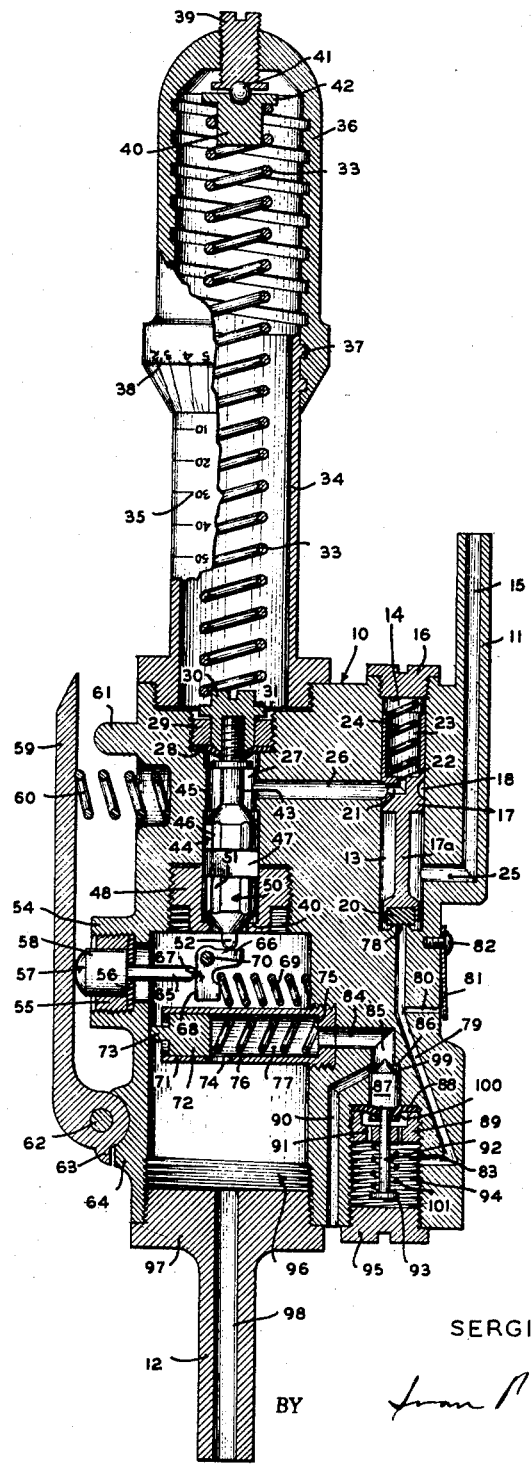
INVENTOR
SERGIO LISIAK
ATTORNEY United States Patent Office
2,933,098
Patented Apr. 19, 1960

2,933,098
AUTOMATIC VALVE FOR INFLATION OF AUTOMOBILE TIRES

Sergio Lisiak, Montevideo, Uruguay

Application September 6, 1957, Serial No. 682,545

19 Claims. (Cl. 137—224)

This invention relates to a valve, and more particularly to a valve for use in inflating pneumatic tires.

The object of the invention is to provide a valve which is an improvement over the valves shown and described in my prior applications Serial No. 522,729, filed July 18, 1955, now abandoned, and Serial No. 578,354, filed April 16, 1956, of which applications this application is a continuation-in-part.

Another object of the invention is to provide a valve for use in inflating tires such as pneumatic tires wherein there is provided a valve body which has an inlet conduit connected thereto whereby the valve can be connected to a suitable source of air under pressure, and whereby an outlet conduit extends from the valve body so that the tire to be inflated can be supplied with air, the valve further including a sounding device which permits the user of the device to ascertain when the proper amount of air has been added to the pneumatic tire, there being a manually operable regulating mechanism for controlling the valve.

A still further object of the invention is to provide a valve which is automatic in operation so that the attention of the user is not required when inflating the tire, and wherein a sounding device is provided for automatically indicating to the user the condition of the device and pneumatic tire being inflated.

Another object of the invention is to provide a valve which automatically not only inflates but also deflates the tire when the pressure within the pneumatic tire is higher than the one previously indicated.

A further object of the invention is to provide an automatic valve which is extremely simple and inexpensive to manufacture.

A further object of the invention is to provide an automatic valve comprising an inlet conduit for connecting said valve to a fluid supply, an outlet conduit for connecting said valve to a fluid receiver, a first valve means in communication with said inlet conduit, a second valve means controlling communication between said first valve means and a chamber in communication with the outlet conduit, said chamber also being in communication with the atmosphere, a third valve means controlling communication between said chamber and the atmosphere, the third valve means being responsive to the flow of the fluid through the first valve means. There is also provided an indicating means responsive to the operation of the first valve means.

Other objects and advantages will be apparent during the course of the following description.

The single figure of the drawing, forming a part of this application, is a view in elevation, with parts broken away and in section, showing the automatic valve of the present invention.

In this figure, the different parts are shown in section except valves 44, 50 and 87 and button 57.

In order to make clear the operation of the parts which constitute the object of this invention air filters and other non-essential details are not shown. The tube normally connected to the inlet 11 which connects the valve to the fluid under pressure is not shown. Neither is there shown the tube which is normally connected to the outlet conduit 12. Also is omitted the nozzle generally connected to the outlet tube. This nozzle must be of the open type, i.e. it must allow the free flow of air although the valve is at rest.

In this figure the different parts of the valve are shown in the position which occurs when the valve is at rest, as hereinafter described, but with the inlet conduit coupled to the source of fluid under high pressure, said pressure being normally produced by the air compressors designed for this purpose.

Referring in detail to the drawing, the numeral 10 designates a valve body which may be made of any suitable material. Extending from the valve body 10 and secured thereto or formed integral therewith is an inlet conduit 11 which is adapted to be connected to a suitable source of air under pressure. Also extending from the valve body 10 is an outlet conduit 12 and the outlet conduit 12 is adapted to be connected to the pneumatic tire which is being inflated.

The valve body 10 has a straight bore having two sections or chambers, a lower chamber 13 and an upper chamber 14, completely isolated from the outside by the threaded plug 16. Within said bore a plunger 17 is slidably mounted, and the upper end of said plunger 17 has a bore 23 to accommodate an expansion spring 24 bearing on the plug 16. The other end of said plunger 17 has a narrower projection 17a which ends with the valve member 20. The pressure of said spring 24 on the plunger 17 keeps the valve member 20 applied on the opening 78, keeping said opening 78 closed. The plunger 17 is provided with an outer annular groove 18 communicating through bores 21 and 22 to the chamber 14. Facing said groove 18 is a conduit 26 drilled in the valve body 10. The lower chamber 13 permanently communicates with the compressed air line through passageways 25 and 15 of conduit 11, and the upper chamber 14 permanently communicates with the chamber 27 through conduit 26.

The valve body 10 is further provided with a chamber 27 which is crossed by the shank 43 of the valve 44 and opens into the wider chamber 47 forming the seat 45 for the valve 44 in the rim of said chamber. The cylindrical chamber 47 is a guide for the cylindrical part of said valve 44 containing longitudinal grooves 46 for the passage of the air from the chamber 27 to the chamber 47. The other end of the shank 43 projects through an elastic diaphragm 28 circumferentially secured on said body 10 by the collar 29 threaded to said valve body 10. The end of said shank 43 is threaded to the member 30 which has an enlargement 31 to support the spring 33. The collar 29 serves also as a guide for the member 30.

The coil spring 33 projects through a first housing 34 and into a second housing 36, and the exterior of the housing 34 is provided with indicia or markings 35. The housing 36 threadedly engages the housing 34 as at 37, and the housing 36 is provided with indicia or markings 38 for coaction or cooperation with the indicia 35. A bushing 39 is adjustably connected to an end of the housing 36, and the bushing 39 is arranged adjacent to a second bushing 40, there being a ball bearing 41 interposed between the bushings 39 and 40. An annular flange 42 extends outwardly from the bushing 40, and flange 42 engages the adjacent end of the coil spring 33.

The member 48 threaded to the valve body 10 forms in the inside the extension of said chamber 47, said member 48 being provided at its lower end with a rim forming the seat 49 for another valve 50 slidably mounted within said chamber 47 and provided also with grooves 51 on its cylindrical surface for the passage of air therethrough from chamber 47 to a chamber 96. Said valve 50 is provided with a finger 52 for a purpose described hereinafter. This chamber 96, at its end is completely sealed by the plug 97 threaded to the valve body 10 and its extension, conduit 12, is adapted to be connected to a container or to a pneumatic tire, said extension being provided with passageway 98 through its whole length.

Extending outwardly from the valve body 10 and secured thereto or formed integrally therewith, is an interiorly threaded collar 54 which has a ring or bushing 55 arranged in threaded engagement therewith. Elastic diaphragm 56, having an opening to permit passage of shank 65, is maintained in position by bushing 55. A movable plunger 57 is slidably mounted in the ring or bushing 55, and the plunger 57 includes a head 58 and a shank or stem 65. The shank 65 of the plunger 57 is arranged in engagement with a keeper 67, the keeper 67 being pivotally mounted on a pivot pin 70. The keeper 67 includes a first portion 68 and a second portion 66, and the portion 66 engages the finger 52 on the end of the valve 50.

A coil spring 69 is arranged in engagement with the portion 68 of the keeper 67.

A lever 59 is pivotally connected to the valve body 10 through the medium of a pivot pin 62, and the lever 59 is adapted to be manually operated. A shoulder 63 on the lever 59 is adapted to coact with a shoulder 64 on the valve body 10 for limiting the pivotal movement of the lever 59. The lever 59 has a coil spring 60 arranged in engagement therewith, and a stop lug 61 extends outwardly from a portion of the valve body 10 for engagement by the lever 59 as the lever 59 is depressed inwardly.

In chamber 96 is mounted cylindrical tube 71. One end of the cylindrical tube 71 is threaded into the wall of the cylindrical chamber 96, the other end of said tube 71 being open and communicating with chamber 96. The threaded end of said tube 71 has an internally thickened wall which forms shoulder 75. The expansion spring 76 bears on said shoulder 75 keeping the slidable plunger 72 within said tube 71. The plunger 72 is provided with a projection 73 forming a stop to limit the outwardly movement of said plunger. The side wall of the tube 71 has a port 74 which is in communication with the chamber 96 and the chamber 77. This side port 74 is arranged just under the inner face of the plunger 72 so that when the plunger 72 moves down within the tube 71, against the pressure of the spring 76, it closes said port, i.e. closes the communication between the chamber 96 and the chamber 77.

The conduit 85 in communication with conduit 84 which communicates with chamber 77 opens into a wider chamber 99, the edge of the conduit 85 forming the seat 86 for the valve 87 slidably arranged into said chamber 99. The conduit 90 provides communication between the chamber 99 and the exterior atmosphere. The chamber 99 is completely sealed from chamber 94 by the diaphragm 88 which is centrally placed into the groove 100 formed in the cylindrical surface of the valve 87 and is circumferentially secured by the collar 89 threaded into the chamber 94. The central opening in said collar 89 allows the extension 92 of said valve to project through said collar. The end of said extension 92 has a widened end portion 93 and an expansion spring 101 is placed between said end portion 93 and the collar 89. The collar 89 includes bores 91 providing communication between the chamber 94 and the medium acting on the diaphragm. The chamber 94 is completely sealed by the cover 95 threaded to said chamber 94. The conduits 83 and 79 provide communication between the chamber 94 and the opening 78 in the chamber 13. The bore 80 communicates with the conduit 79 and opens to the exterior atmosphere facing an elastic blade 81 secured by the screw 82 to the valve body 10, and said elastic blade constitutes the sounding device.

From the foregoing it is apparent that there has been provided an automatic valve which is an improvement over the automatic valves shown in my prior applications Serial Nos. 522,729 and 578,354. In use, the conduit 11 is adapted to be connected to a suitable source of air under pressure, and the outlet conduit 12 is adapted to be connected to the pneumatic tire of a wheel so that the tire can be automatically inflated. Due to the provision of the sounding element 81, the user or operator will be accurately advised of the conditions prevailing in the tire.

While the present invention has been specifically described for use in inflating tires with air, it is to be understood that the valve may have general utility and can be used for handling other fluid mediums besides air, and the valve can also be used for use with other devices besides vehicle tires. By properly adjusting the regulation mechanism including the housing 36, a tire can be automatically inflated to the desired pressure and the tire will automatically inflate itself or deflate itself without the necessity of having the operator continually watch the apparatus.

The indicia such as the indicia 35 and 38 coact so as to form a scale which can be used for setting the valve at the desired regulating pressure. In view of the fact that the valve operates automatically, the attention of the operator is not required so that there will result a saving of time in inflating tires and also mistakes will be avoided in filling tires with air. Furthermore, due to the provision of the acoustic element or sounding member 81, the operator of the device as well as the occupants of the vehicle or other persons in the vicinity will be informed as to the conditions prevailing in the tire.

*Operation*

The present drawing shows the details of the valve in a position such as when the inlet conduit is connected to the tube of air under pressure and the outlet 12 is provided with an open nozzle, i.e. when the air in the chamber 94 is at atmospheric pressure, being the valve at rest. In this condition, without depressing the handle 59, the valve 50 is closed by the air pressure which is the same in all the chambers and conduits between the inlet conduit 15 and said valve 50. Due to this equality of pressures in all said spaces, the valve 44 remains open by the pressure of the spring 33 and the valve 20 remains closed by the pressure of the spring 24 on the plunger 17. Thus, said valve 50 actuates as a main valve which avoids the passage of air to the outlet 93.

In order to explain better the operation of the valve of the present invention, in the first place there will be explained the operation of the members 72, 87 and the port 74.

When the chamber 96 contains air under a pressure greater than the atmospheric pressure and the valve 87 is open by pressure of the spring 101, i.e. the chamber 77 of tube 71 communicates with the conduit 90 opening to the outer atmosphere, the pressure is relatively lower in chamber 77 and the air in the chamber 96 escapes through the side port 74 in the tube 71. Due to the difference of pressure between chamber 96 and chamber 77, the plunger 72 remains pressed toward the inside of the tube 71 tending to close port 74. The higher this difference of pressure, the greater the pressure on plunger 72 urging plunger 72 toward conduit 84 (to the right in the drawing). As the plunger 72 moves to the right, it tends to close port 74. Thus, the opening of the port 74 is smallest when the pressure in the chamber 96 is greatest and conversely when the pressure in the chamber 96 is less, the opening in the port 74 is larger. This automatic regulation or closing and opening of the port 74 allows an even air outlet from chamber 96 to the outer atmosphere and tends to keep the pressure within the chamber 96 equal to or almost equal to the pressure within the pneumatic tire. The spring 76 regulates the run of piston 72 and the spring 76 is selected so that the position of the piston 72 will move as described above according to the difference in pressure in the chamber 96. It is noted that piston 72 never completely closes port 74 since such closing would prevent release of the excess pressure in chamber 96.

Valves 44 and 50 are two independent valves slidable in the same cylindrical chamber 47. The seat for valve 44 is placed in the upper portion of said chamber 47, and the seat for valve 50 is placed in the lower portion of said chamber 47.

Valve 44 operates automatically by the difference between the pressure in chamber 47 and the pressure applied by the spring 33 on said valve 44. The valve 50 is operated by the handle 59 and remains closed when the apparatus is at rest, because the pressure within the chamber 47 is always higher than the pressure within the tire. To operate the apparatus, it is necessary to open said valve, that is, to depress handle 59.

For a better understanding of the operation of this invention, the following three basic cases will be discussed:

A. Inflation—when the air pressure within the tire is lower than the desired pressure.

B. Deflation—when the air pressure within the tire is higher than the desired pressure.

C. When the air pressure within the tire is the desired pressure.

In all the above three cases the first step is to mark in the apparatus the pressure desired in the tire. The adjustment of said pressure depends upon the tension of spring 33, that is, the pressure applied by said spring 33 upon valve 44. Screwing the cover 36 by means of the thread 37 on the tube 34, the screw 39 which adjusts the tension of the spring 33 depresses, through the ball 41, the member 40 containing a flange 42 engaged by the upper end of the spring 33. The other end of said spring 33 bears on the enlargement 31 of the member 30, the valve 44 being threaded thereto. The screwing of cover 36, that is, the tension of the spring 33, can be read on the indicia 35 marked on the tube 34 and the indicia 38 marked on the cover 36.

A. *Inflation—when the air pressure within the tire is lower than the desired pressure*

Once the desired pressure is marked on the indicia 35 and 38, the outlet 98 is connected to the container or pneumatic tire and the lever 59 is depressed as far as the stop 61. When the lever 59 is depressed, button 57, guided by the collar 55, moves toward the interior of the valve. The air in chamber 96 cannot escape to the exterior through the opening defined by collar 55 because the elastic diaphragm 56, due to the air pressure in chamber 96, tightly seals the opening. The extension 65 of said button 57 depresses the portion 68 of the member 67 pivotally mounted on the axis 70 secured to the valve body 10, and when this member 67 is moved by the extension 65 it moves through its portion 66 the finger 52 of the valve 50 leaving said valve 50 in open position.

Thus, the chamber 47 is placed in communication with the chamber 96 and the grooves 51 allow the air passage between said chambers 96 and 47. At this moment, the valve 44 being open due to the pressure applied by the spring 33, the pressure in the chamber 27, said chamber 27 being in communication with the chamber 47 through the grooves 46 formed in the cylindrical portion of the valve 44, and in the conduit 26 and in the chamber 14, is equal to the pressure within the tire. As this pressure is lower than the pressure of the compressed air in the conduit 15 and in the chamber 13, the plunger 17, due to the difference of pressure, moves towards the cover 16 against the tension of the spring 24, and uncovers the conduit 26 which thus communicates directly to the chamber 13.

At the same time the valve 20 is opened and the communication between said chamber 13 and the chamber 94 is established. The pressure in the chamber 94 is equal to the pressure of the compressed air and said air entering through the bores 91 formed on the collar 89 apply pressure on the elastic diaphragm 88 and through said diaphragm 88 on the valve 87 closing it against the pressure of the spring 101. Thus, the conduit 90 from the chamber 96 to the outer atmosphere is closed. As the valve 20 remains open, the compressed air passes from the conduit 79 and the secondary conduit 80 to the outer atmosphere operating the sounding device 81.

In this way the compressed air flows from the inlet 15 through the chamber 13, conduit 26, chamber 27, grooves 46 of the valve 44, the chamber 47, grooves 51 of the valve 50 and the chamber 96 to the tire until the pressure in the tire and therefore in the chamber 47 is equal to the pressure applied by the spring 33 to the valve 44, that is, when the pressure reaches the pressure marked or indicated on the indicia 35 and 38. At this moment the valve 44 is closed, the pressure in the chamber 27, in the conduit 26 and in the chamber 14 remains equal to the pressure of the compressed air in the chamber 13, and as said pressure in the chambers 13 and 14 is the same, the spring 24 pushes the plunger 17 and the valve 20 closing the opening 78.

Thus, the compressed air remaining in the chamber 94 and in the conduit 79 escapes through the conduit 80 and the pressure in said chamber 94 and in said conduit 79 is reduced to the atmospheric pressure. The tension of the spring 101 opens the valve 87 and the operation of the sounding device 81 is discontinued indicating that the inflation process is finished. As the lever 59 is released, said lever 59 by direct action of the spring 60 and by the pressure of the spring 69 on the button 57 through the member 67, returns to its normal position limited by the stops 63 and 64 and the valve 50, due to the pressure in the chamber 47 closes the communication between the chamber 96 and the inlet 15.

B. *Deflation—when the air pressure within the tire is higher than the desired pressure*

Once the desired pressure is marked on the indicia 35 and 38, the outlet 12 communicated to the tire and the lever 59 depressed as far as the stop 61, the valve 50 is opened and the communication between the chamber 96 and the chamber 47 is established. As the pressure in the tire and therefore in the chamber 96 and in the chamber 47 is higher than the pressure applied by the spring 33 on the valve 44, said valve 44 remains closed the same as the valve 20 because the plunger 17 remains under pressure of the spring 24. As the chamber 94 and the conduit 79 have atmospheric pressure, the valve 87 remains open by the spring 101 and the sounding device 81 does not operate.

When the valve 87 is opened, the communication between the chamber 96 and the outlet 90 to the outer atmosphere is established through the port 74 in the tube 71, the chamber 77 and the conduits 84 and 85 to the outlet 90. As this communication results in the pressure in the chamber 77 being lower than the pressure of the air in the chamber 96, the air in chamber 96 applies pressure on the outer face of the plunger 72 which enters further into said chamber 77 against the pressure of the spring 76 on its inner face. As the plunger 72 changes its position it partially closes the port 74. The air flowing from the chamber 96 and therefore from the tire, lowers the pressure in said chamber 96 and therefore in the chamber 47. When said pressure in the chamber 47 becomes equal to the pressure applied by the spring 33 on the valve 44, in opposite direction, the slightest further reduction of said pressure causes the valve 44 to be open and, therefore, a relatively reduced pressure is provided in the chamber 27, conduit 26 and chamber 14, for which the plunger 17, due to the difference of pressure between chambers 14 and 13, adopts a position, against the pressure of the spring 24, opening the communication between the chamber 19 and the conduit 26 and the valve 20 opens the communication between the chamber 13 and the opening 78, the conduits 79, 83 and the chamber 94 remaining thus under the pressure of the compressed air. At this moment the pressure of the air in the chamber 94 actuates on the diaphragm 88 and, therefore, on the plunger 87 and when it is higher than the pressure of the spring 101, it closes the communication between the conduit 85 and the outlet conduit 90. At the same time, due to the pressure in the conduit 79 and the air flow through the conduit 80 to the outer atmosphere, the sounding device 81 begins to operate. This indicates that the deflation process is finished and that the valve is to be disconnected from the tire and that the handle 59 is to be released so that due to the pressure of the springs 60 and 69 it may return to its normal position limited by the stops 63 and 64.

C. *When the air pressure within the tire is the desired pressure*

Once the desired pressure is marked on the indicia 35 and 38, the outlet 12 connected to the tire and the lever 59 depressed as far as the stop 61, the valve 50 is opened and the communication between chamber 96 and chamber 47 is established. The chamber 27, the conduit 26 and the chamber 14 remain under the same pressure existing in the chamber 13, that is, the plunger 17 depressed by the spring 24 remains in its position and the valve 20 remains closed. Due to the atmospheric pressure existing in the conduits 79, 83 and in the chamber 94, the valve 87 remains in its open position by the spring 101, that is, the communication between the chamber 96 and the outlet 90 opening to the outer atmosphere remains open. The air begins to flow from the chamber 96 to said outlet 90 but, at the same time the pressure in the chambers 96 and 47 decreases and the pressure of the spring 33 opens the valve 44. Air flows through conduit 26, plunger 17 moves upward to open the valve 20. The conduit 79 and the chamber 94 remain under a higher pressure, the sounding device 81 begins to operate and the valve 87 remains closed. The inflation process as in case A is started but, due to the slight difference between the pressure in the chamber 47 and the opposite pressure on the valve 44 from the spring 33, said inflation is rapidly effected, the valve 44 is closed as well as the valve 20, the valve 87 is opened and the operation of the sounding device 81 is discontinued. When the handle 59 is maintained depressed as far as the stop 61, there is obtained a successive repetition of the processes in cases A and B and the sounding device 81 gives an intermittent sound indicating that the pressure within the pneumatic tire is equal to the pressure marked on the indicia 35 and 38.

The mechanism regulating the stress of the spring 33 is shown in the figure only by way of example and may be of any other type which indicates the stress of said spring.

The valves 44, 50 and 87 are shown as conical valves in order to simplify the drawing, but they can also be flat valves, rubber valves, etc.

The sounding device shown in the figure as an elastic plate 81 which is vibrated by the pressure of the outcoming air is shown by way of example and any other sounding device operated by air flow may be used.

I claim:

1. An automatic valve comprising a valve body, an inlet conduit for connecting said body to a fluid supply, an outlet conduit for connecting said body to a fluid receiver, a first chamber in said body in communication with said outlet conduit, a second chamber in said body in communication with said inlet conduit, first conduit means providing communication between said first and second chambers, first valve means controlling flow between said second chamber and said first conduit means, second valve means controlling flow in said first conduit means between said first valve means and said first chamber, second conduit means providing communication between said first chamber and the atmosphere, third valve means controlling flow in said second conduit means, said third valve means being responsive to the flow of fluid in said second chamber, third conduit means between said second chamber and said third valve means, and a valve means for controlling flow in said third conduit means, said last-named valve means being responsive to the movements of said first valve means.

2. An automatic valve as recited in claim 1 in which said second valve means comprises a selectively adjustable regulating valve means and an actuating valve means, said regulating valve means controlling communication between said first valve means and the actuating valve means, said regulating valve means being selectively adjustable to operate at predetermined pressures, said actuating valve means controlling communication between said regulating valve means and said first chamber.

3. An automatic valve as recited in claim 1 having indicating means in communication with said third conduit means and responsive to the pressure therein.

4. An automatic valve as recited in claim 1 in which a fourth valve means controls communication between the first chamber and the third valve means, said fourth valve means being responsive to the pressure in said first chamber.

5. An automatic valve as recited in claim 4 in which said fourth valve means comprises a third chamber in communication with the first chamber, a piston slidably mounted in said third chamber, said piston reducing communication between said first and third chambers when the fluid pressure in said first chamber is in excess of that in said third chamber.

6. An automatic valve as recited in claim 1 having indicating means responsive to the flow of fluid in said second chamber.

7. An automatic valve comprising a valve body, an inlet conduit for connecting said body to a fluid supply, an outlet conduit for connecting said body to a fluid receiver, a first chamber in said body in communication with said outlet conduit, a second chamber in said body, a slidably mounted piston defining a first valve means, said piston dividing said second chamber into an upper chamber and a lower chamber, said lower chamber being in communication with said inlet conduit, first conduit means providing communication between said first chamber and said upper chamber, said piston permitting communication between said lower chamber and said first conduit means when the fluid pressure in the upper chamber is lower than the fluid pressure in the lower chamber, a second valve means controlling flow in said first conduit means between said first valve means and said first chamber, second conduit means providing communication between said first chamber and the atmosphere, third valve means controlling flow in said second conduit means, said third valve means being responsive to the flow of fluid in said lower chamber, third conduit means between said lower chamber and said third valve means, and a valve means for controlling flow in said third conduit means, said last-named valve means being responsive to movements of said first valve means.

8. An automatic valve as recited in claim 7 in which said last-named valve means being responsive to movements permits communication between said lower chamber and said third conduit means when said piston permits communication between the lower chamber and said first conduit means, thereby permitting fluid to flow from the lower chamber to said third valve means to actuate said third valve means and prevent communication between said first chamber and the atmosphere.

9. An automatic valve as recited in claim 8 in which said last-named valve means is on the lower end of said piston and movable therewith.

10. An automatic valve as recited in claim 9 in which indicating means is in communication with said third conduit means and responsive to the pressure therein.

11. An automatic valve as recited in claim 9 in which said second valve means comprises a selectively adjustable regulating valve means and an actuating valve means, said regulating valve means controlling communication between said first valve means and the actuating valve means, said regulating valve means being selectively adjustable to operate at predetermined pressures, said actuating valve means controlling communication between said regulating valve means and said first chamber.

12. An automatic valve as recited in claim 11 in which a fourth valve means controls communication between the first chamber and the third valve means, said fourth valve means being responsive to the pressure in said first chamber.

13. An automatic valve as recited in claim 12 in which said fourth valve means comprises a third chamber in communication with the first chamber, a piston slidably mounted in said third chamber, said piston reducing communication between said first and third chambers when the fluid pressure in said first chamber is in excess of that in said third chamber.

14. An automatic valve as recited in claim 9 in which a fourth valve means controls communication between the first chamber and the third valve means, said fourth valve means being responsive to the pressure in said first chamber.

15. An automatic valve as recited in claim 14 in which said fourth valve means comprises a third chamber in communication with the first chamber, a piston slidably mounted in said third chamber, said piston reducing communication between said first and third chambers when the fluid pressure in said first chamber is in excess of that in said third chamber.

16. An automatic valve as recited in claim 7 in which a fourth valve means controls communication between the first chamber and the third valve means, said fourth valve means being responsive to the pressure in said first chamber.

17. An automatic valve as recited in claim 16 in which said fourth valve means comprises a third chamber in communication with the first chamber, a piston slidably mounted in said third chamber, said piston reducing communication between said first and third chambers when the fluid pressure in said first chamber is in excess of that in said third chamber.

18. An automatic valve comprising a valve body, an inlet conduit for connecting said body to a fluid supply, an outlet conduit for connecting said body to a fluid receiver, a first chamber in said body in communication with said outlet conduit, a second chamber in said body in communication with said inlet conduit, first conduit means providing communication between said first and second chambers, first valve means controlling flow between said second chamber and said first conduit means, second valve means controlling flow in said first conduit between said first valve means and said first chamber, second conduit means providing communication between said first chamber and the atmosphere, and third valve means controlling flow in said second conduit means, said second valve means closing communication between said first chamber and said first valve means when the pressure in said first chamber equals a predetermined pressure, and means responsive to the pressure in said first chamber for actuating said third valve means when the pressure in said first chamber exceeds said predetermined pressure to provide communication between said first chamber and the atmosphere.

19. An automatic valve comprising a valve body, an inlet conduit for connecting said body to a fluid supply, an outlet conduit for connecting said body to a fluid receiver, a first chamber in said body in communication with said outlet conduit, a second chamber in said body, a piston slidably mounted in said second chamber, said piston defining a first valve means and dividing said second chamber into an upper chamber and a lower chamber, said lower chamber being in communication with said inlet conduit, first conduit means providing communication between said first chamber and said second chamber, said first conduit means being in permanently open communication with said upper chamber, resilient means normally urging said piston downwardly, said piston in the downward position preventing communication between said lower chamber and said first conduit means and permitting communication between said lower chamber and said first conduit means when in an upward position, said piston moving upwardly when the pressure in said inlet means is greater than the pressure in said upper chamber and sufficiently great to overcome the force of said resilient means on said piston, a second valve means controlling flow in said first conduit means between said first valve means and said first chamber, said second valve means comprising a selectively adjustable regulating valve means, and a manually operable actuating valve means, said regulating valve means being selectively adjustable to operate at a predetermined pressure, said regulating valve means permitting communication in said first conduit means between said first valve means and said actuating valve means when the pressure in said first chamber is less than said predetermined pressure, said actuating valve means controlling communication between said regulating valve means and said first chamber, second conduit means providing communication between said first chamber and the atmosphere, third valve means controlling flow in said second conduit means, third conduit means between said lower chamber and said third valve means, said third valve means being responsive to the pressure in said third conduit means, indicator means in communication with said third conduit means responsive to pressure therein, and a valve means in said lower chamber for controlling flow in said third conduit means, said last-named valve means being responsive to the movements of said first valve means and opening when said first valve means is in an upper position whereby fluid can flow through said third conduit means to close said third valve means.

References Cited in the file of this patent

UNITED STATES PATENTS

| | | |
|---|---|---|
| 1,584,936 | Harris | May 18, 1926 |
| 1,615,943 | Harris | Feb. 1, 1927 |
| 1,636,077 | Ryan | July 19, 1927 |
| 1,652,051 | Rogers | Dec. 6, 1927 |
| 1,814,206 | Donkin | July 14, 1931 |
| 1,818,178 | Weisberg | Aug. 11, 1931 |